R. T. JOHNSTON.
ATTACHMENT FOR MELTING FURNACES.
APPLICATION FILED DEC. 14, 1907.
1,036,853.
Patented Aug. 27, 1912.
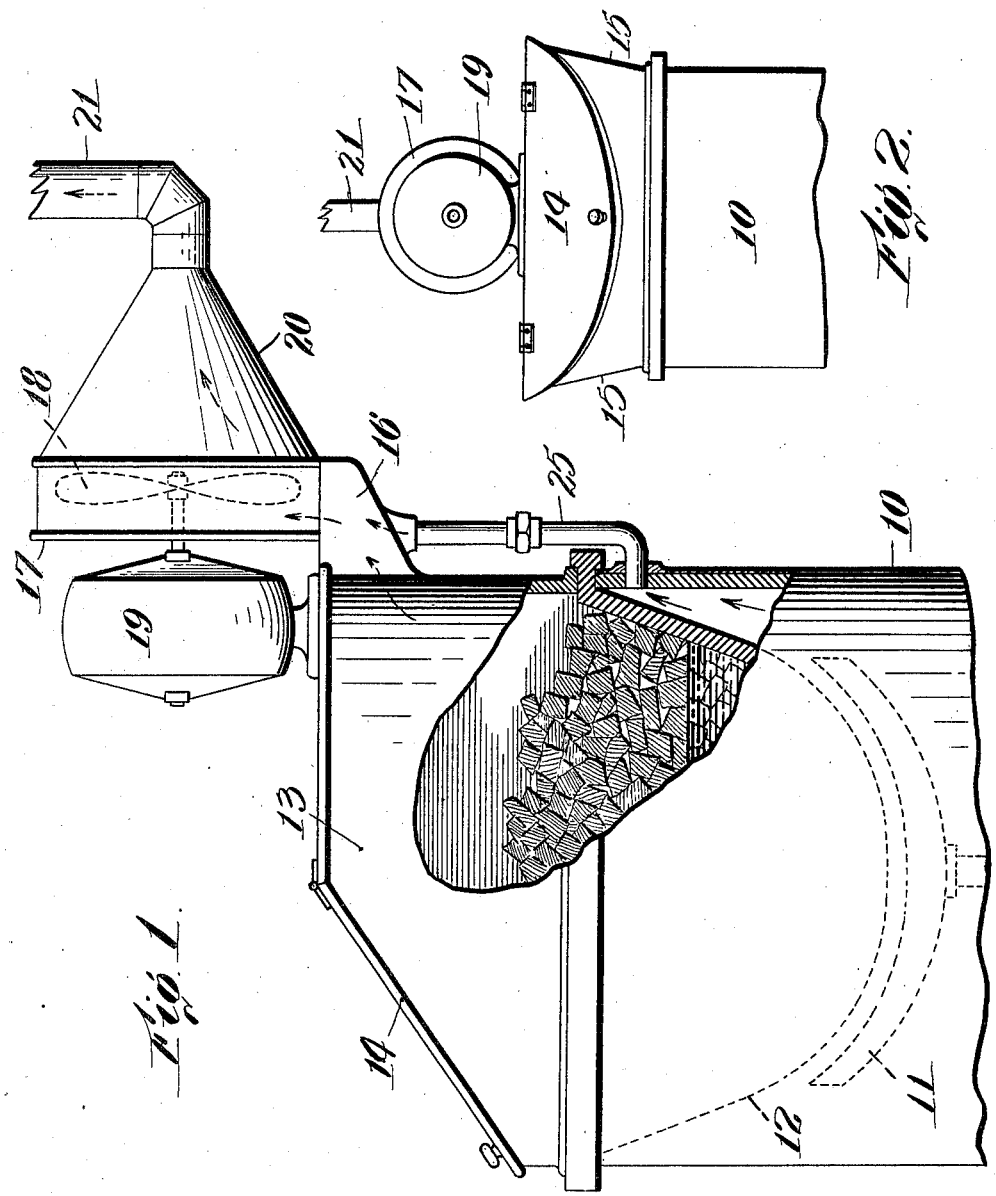

UNITED STATES PATENT OFFICE.

ROBERT T. JOHNSTON, OF SCOTCH PLAINS, NEW JERSEY, ASSIGNOR, BY MESNE ASSIGNMENTS, TO AUTOMATIC FURNACE CO., OF NEW YORK, N. Y., A CORPORATION OF NEW YORK.

ATTACHMENT FOR MELTING-FURNACES.

1,036,853.     Specification of Letters Patent.     Patented Aug. 27, 1912.

Application filed December 14, 1907. Serial No. 406,419.

*To all whom it may concern:*

Be it known that I, ROBERT T. JOHNSTON, a citizen of the United States, residing at Scotch Plains, in the county of Union and State of New Jersey, have invented a new and useful Attachment for Melting-Furnaces, of which the following is a specification.

This invention relates to a melting furnace capable of general use, but especially adapted for melting type metal and the like.

As at present constructed, the melting furnaces which are used for re-casting into ingot form the type and slugs made by monotype and linotype machines after the same are used, are open to serious objections. The present practice is to heat a melting furnace full of this material and then to reduce it. In order to provide the melting pot with a complete charge it has to be filled to over-flowing with type and slugs, and even then when it is melted down it will be found very often to be 25% short of the full charge of clear metal. It is not desirable to open the furnace and throw in additional material, as this requires that the extra material be stored in some convenient place, and when the furnace is opened it gives off fumes and soot from the burning carbon, dirt and sweepings in the furnace which get into the room and cause considerable trouble, not only from the dirt that is deposited, but also on account of the obnoxious and poisonous character of the fumes generated by the lead and antimony. So great is this latter difficulty that in most cases these furnaces are arranged in separate rooms provided with mechanical ventilators. Where this is not possible the melting has to be done at night on extra time, which is expensive. This applies also to ordinary type foundries to a certain extent.

The principal objects of this invention are to provide means whereby these furnaces can be operated in the general room of the printing office during working hours without inconvenience, accumulation of dirt and dust, or injury to health, and without excessive expense, and also to provide for charging the melting pot at one time with material sufficient to completely fill the pot when the same is melted so that the furnace will not have to be run on an under charge or opened after the melting has begun. A simple, compact and convenient arrangement for overcoming these objections is provided by this invention in the form of an inclosed hopper for receiving a part of the charge, and holding it until it can be melted down into the melting pot, and for receiving the gases and fumes from the melting pot, and products of combustion from the burner and directing them into a chimney, or the like. This is provided with a passage connected with a fan casing mounted and supported on the hopper from which the air currents are directed outside the room in which the furnace is located, as for instance, up a chimney or stack. The fan also takes the products of combustion, smoke, etc., from the burner through a conduit extending from the upper part of the furnace, and connected with the fan casing.

Reference is to be had to the accompanying sheet of drawings which shows certain preferred forms of the invention, and in which—

Figure 1 is a side elevation of a furnace embodying this invention, partly broken away to show interior construction, and Fig. 2 is a front elevation showing certain modified features.

The invention may be applied to any kind of a furnace suitable for this class of work, and it is shown as applied to one having a casing 10, in which is located a burner 11 adapted to heat a melting pot or caldron 12 which is supported in the upper part of the casing which may be entirely closed at the top thereby.

For the purposes above specified a charging hopper 13 is located on the top of the melting pot or casing so as to cover the former to receive the fumes, gases, smoke, etc., from the molten metal therein, which in type foundries and the like is usually covered with ink, dirt, and dross. This hopper is inclosed for this purpose. It is provided with a door 14 through which pig or other metal may be introduced into the melting pot. The hopper and melting pot together preferably hold a full charge of metal, so that they may be charged once for all, and the door need not be opened again during the melting of the charge. In the form shown in Fig. 2, the hopper is provided with flaring sides 15 for more efficiently serving this purpose. The hopper is provided with an outlet 16 near the top thereof immediately over which is supported an inclosed fan-casing 17 which forms a continuation of the outlet passage and receives the gases, etc., therefrom. In this fan casing is located a fan or blower 18 which may be conveniently operated by means of an electric or other motor 19 also supported on the top of the hopper. By supporting the parts in this way a convenient and compact arrangement in provided which can be easily operated in practice to produce the desired results. The fan casing 17 terminates in a conical portion 20 which extends into a chimney 21 or the like for the purpose of directing the currents into the same, or if desired, it may simply extend through a wall to provide for discharging the gases, fumes, smoke, etc., outside the room in which the furnace is located.

In order to provide for taking care of the products of combustion of the burner or grate by which the pot is heated, a vent pipe or conduit 25 is provided extending up from the upper part of the casing 10 under the top of the melting pot, and entering the outlet 16 so that a continuous passage is provided therefrom to the fan casing, whereby the products of combustion may be taken care of in the same way as the fumes and gases from the melting pot. This conduit preferably is made in two or more parts, so that the hopper may be made removable from the furnace.

While I have illustrated and described preferred forms of the invention, I am aware that many modifications may be made therein by any person skilled in the art without departing from the scope of the same as expressed in the claims. Therefore, I do not wish to be limited to the particular forms shown, but What I do claim is:—

1. The combination with a melting furnace having a melting pot or caldron therein, of a hopper mounted on the top of said furnace and adapted to receive the gases, fumes, etc., from the caldron and provided with a door slanting downwardly from the top thereof through which metal may be introduced, the pot and hopper together having a capacity sufficient to take an entire charge of unmelted metal, and means supported solely by the top of said hopper for drawing the fumes, gases, etc., therefrom and discharging them.

2. In a melting furnace, the combination of a casing, a melting pot therein having outwardly extending flanges at the top projecting over the top edges of the casing and supported thereby, a hopper covering the top of said melting pot and supported directly on said flanges, said hopper and pot together having a capacity sufficient to take an entire charge of unmelted metal, a fan casing carried on the top of the hopper, and a motor casing also carried on top of the hopper adjacent to the fan casing, whereby when said hopper is removed from the pot the fan casing and motor casing will be removed with it.

3. In a melting furnace, the combination of a casing, a melting pot therein having an outwardly projecting flange at the top, said flange having a rib at the top and bottom around its outer edge and resting on the top of the casing, said rib on the bottom of the flange serving to position the pot on the casing, and a hopper adapted to set down on the surface of said flange inside said rib and to be positioned thereby, said hopper having a horizontal top and a slanting door from the top to one side for the admission of a charge, and means carried on the horizontal part of the top of the hopper for positively exhausting the gases and products of combustion from the hopper and casing.

4. The combination with a melting furnace having a melting pot or caldron therein, of a charging hopper located above said furnace and adapted to receive gases, fumes, and the like from said caldron and provided with an outlet passage near the top thereof, a motor supported on the top of said hopper, a fan casing supported by and removable with said hopper and constituting a continuation of said outlet passage, a fan in said casing adapted to be driven by said motor, and means connected with the casing for directing the currents driven by the fan into a flue, chimney, or the like.

In testimony whereof I have hereunto set my hand, in the presence of two subscribing witnesses.

ROBERT T. JOHNSTON.

Witnesses:
 HARRIET LINDSAY,
 ANNIE B. WALTERS.

Copies of this patent may be obtained for five cents each, by addressing the "Commissioner of Patents, Washington, D. C."